United States Patent Office 2,842,691
Patented July 8, 1958

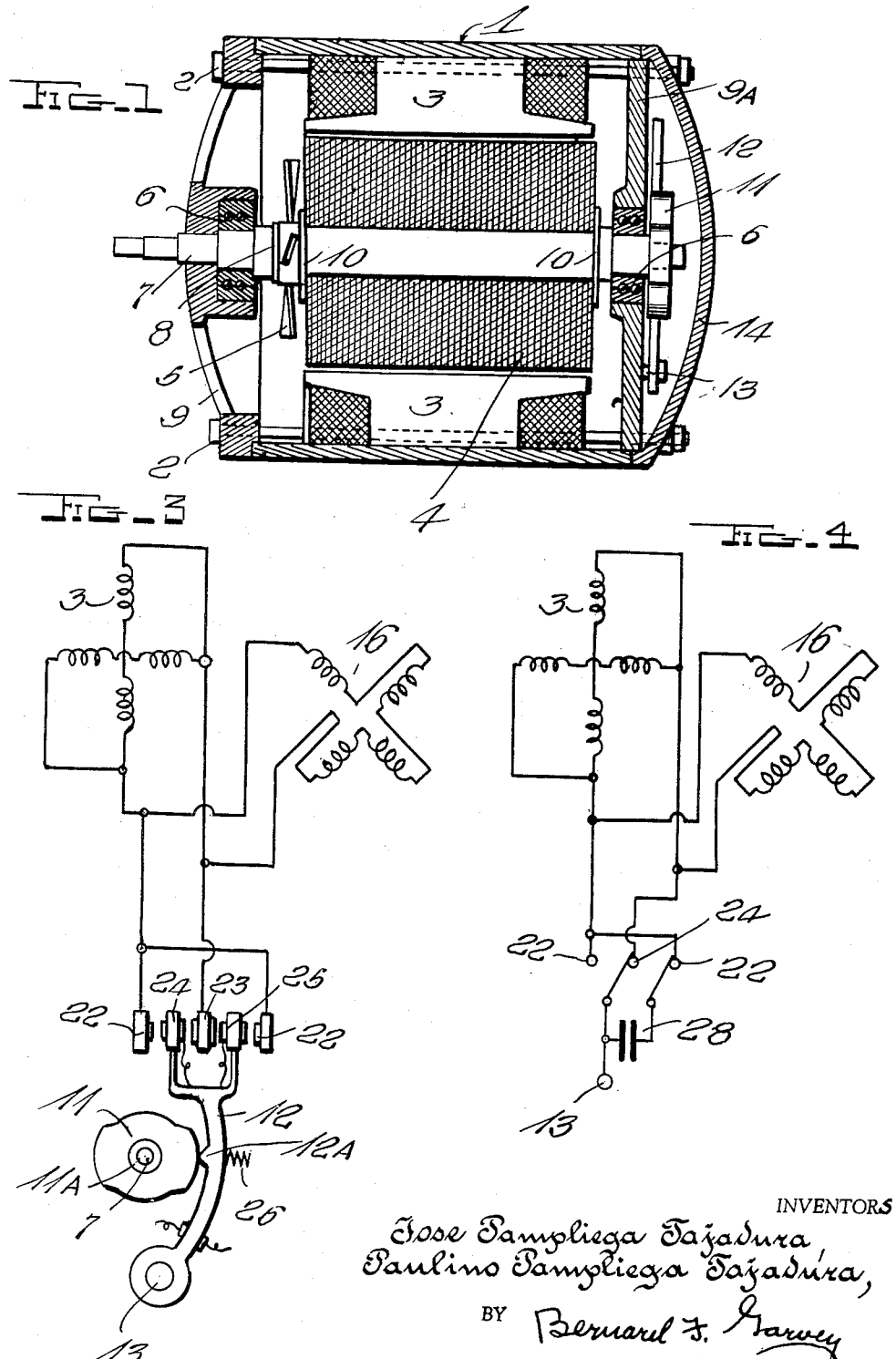

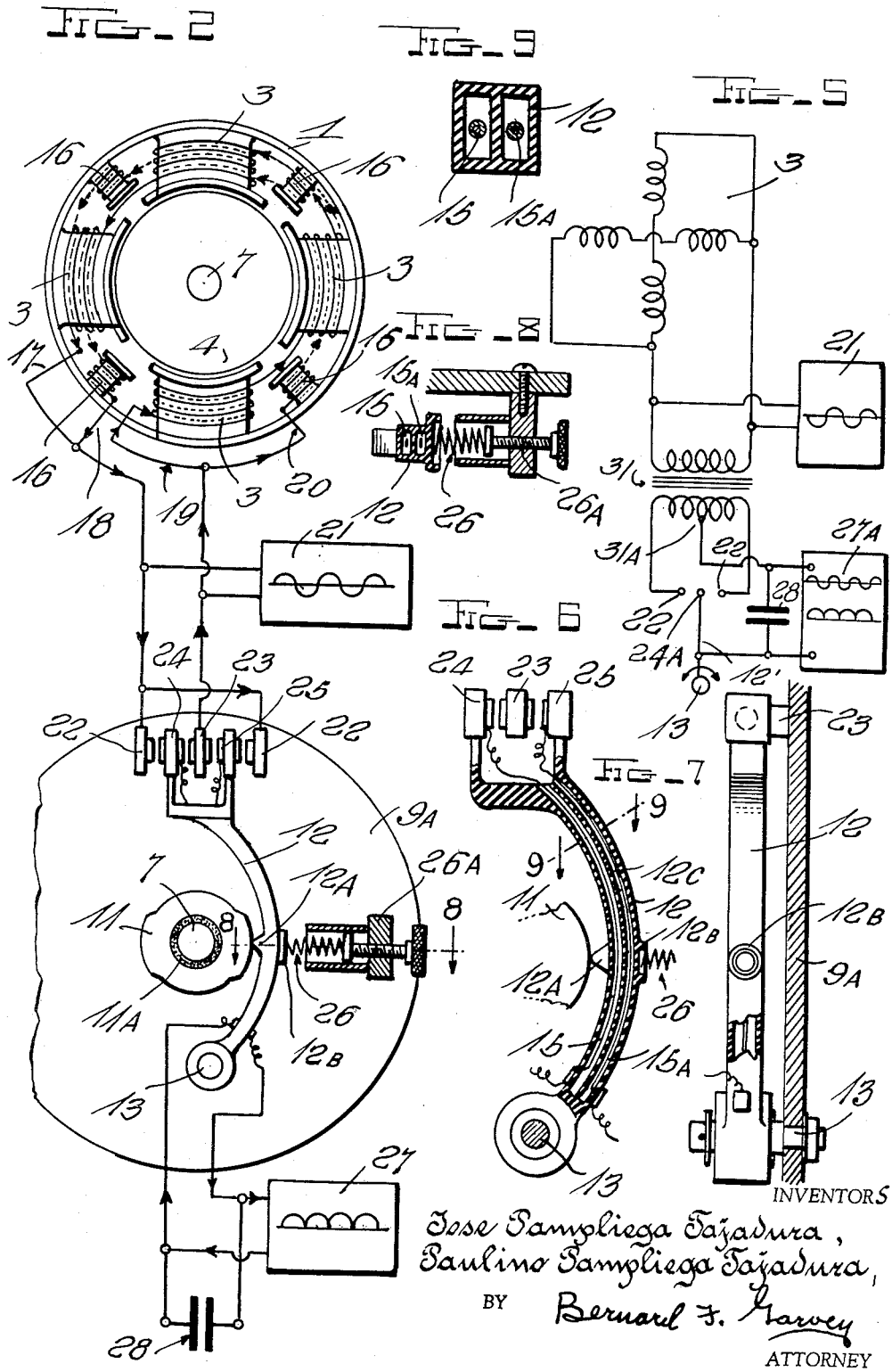

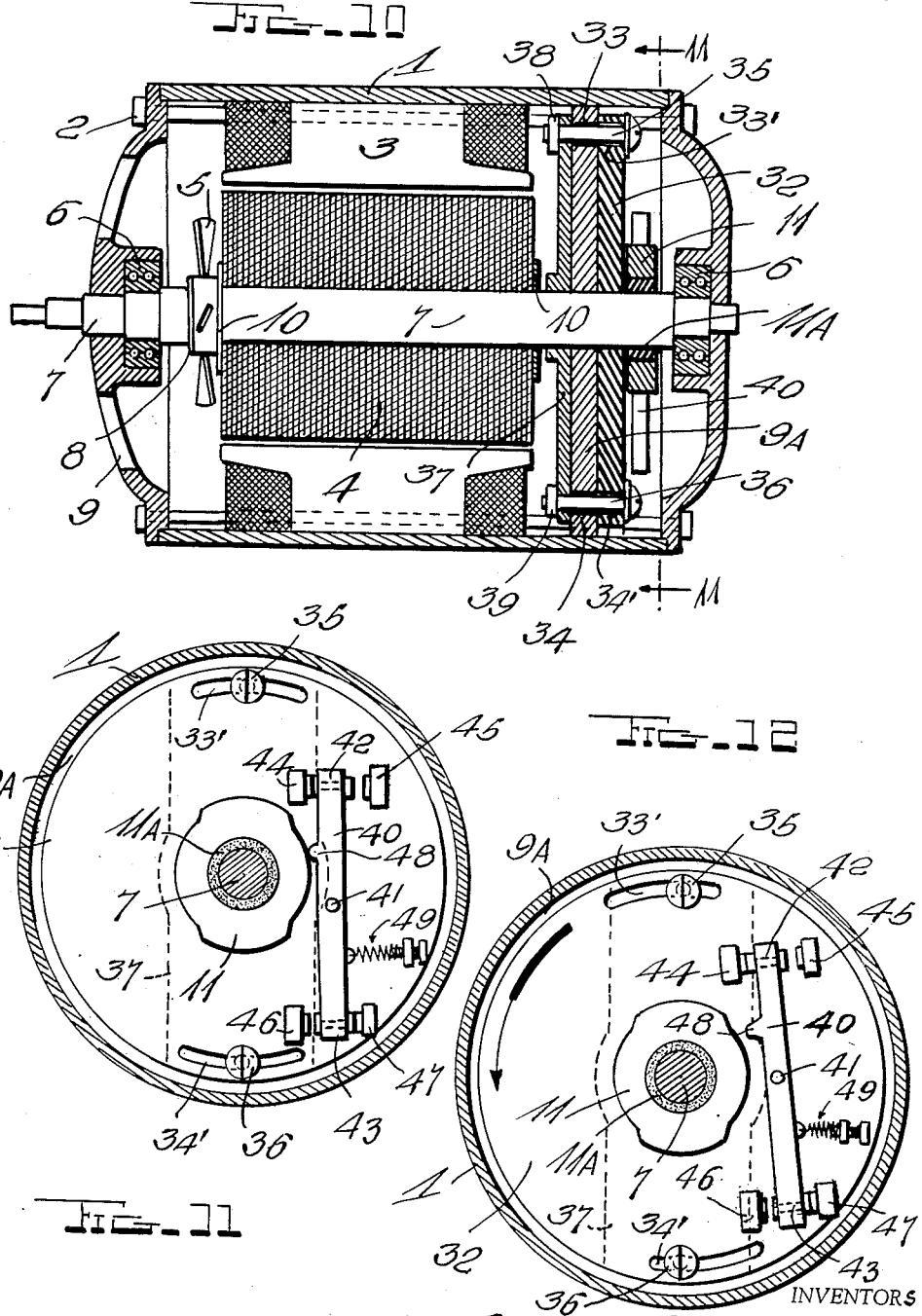

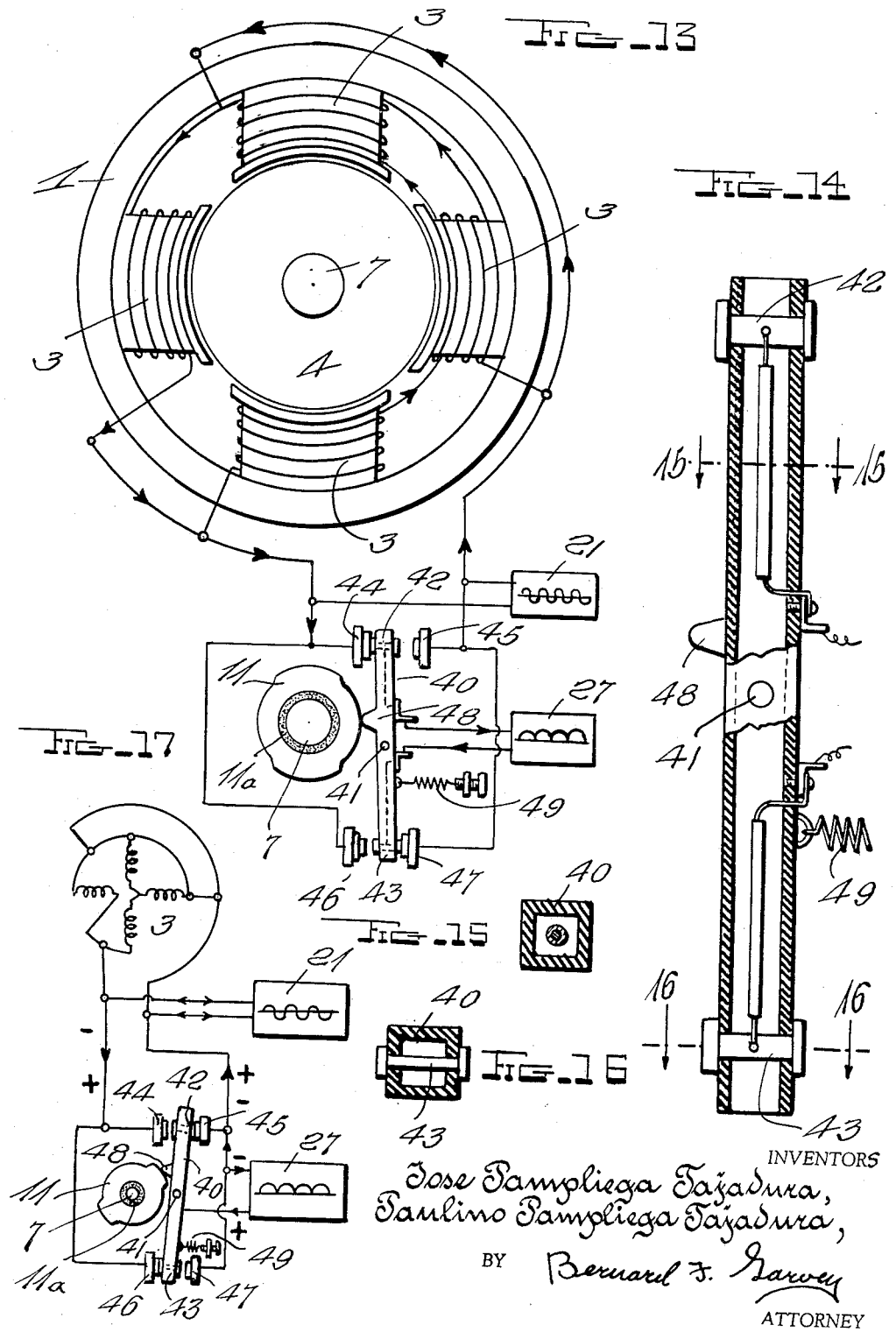

2,842,691

MOTOR DYNAMO

Jose Pampliega Tajadura and Paulino Pampliega Tajadura, Caracas, Venezuela

Application February 6, 1956, Serial No. 563,507

12 Claims. (Cl. 310—138)

Our invention relates broadly to rotative electrical apparatus and more particularly to a motor dynamo unit.

One of the objects of our invention is to provide a compact construction of motor dynamo unit which may be manufactured economically on a mass production scale to meet global application involving electrical power of different characteristics available in different parts of the world.

Another object of our invention is to provide a construction of motor-generator-alternator unit capable of operating as a motor dynamo from a source of power of one available characteristic and simultaneously produce power of another characteristic.

A still further object of our invention is to provide a combination motor-generator-alternator unit which may be manufactured without the conventional commutator with the incidental expense thereof but utilizes in lieu of such commutator an inexpensive precision assembly of cam-controlled contactor for governing the circuit connections between sections of the field winding sections of the rotating unit and the power circuit.

Still another object of our invention is to provide a precision construction of cam-actuated contactor for a motor dynamo unit including a tubular arm pivoted at one end and bifurcated at the opposite end and supporting thereon contacts which coact with fixed contactors for controlling by cyclic make and break action circuit connections between a power circuit and sections of the stator winding of the motor dynamo unit.

Still another object of our invention is to provide a construction of balanced circuit controller for coaction with a driving cam on the shaft of a motor dynamo unit, said circuit controller including a hollow tubular arm carrying contactors on opposite ends thereof, wherein said contactors are connected by conductors which extend through the hollow tubular arm and terminate in circuit terminals adjacent the central pivotal point of said arm enabling circuit connections to be taken from the contacts on said arm while said arm is being driven by said cam.

Still another object of our invention is to provide a balanced circuit controller pivotally mounted for coaction with a driving cam on the shaft of a motor dynamo unit where the pivotal mounting of the circuit controller is orientatable or adjustable with respect to the axis of the shaft in the center of the driving cam for adjusting the relative time of operation of contacts and associated contactors for controlling in proper phase the circuits of the motor dynamo unit with respect to a power circuit.

Other and further objects of our invention reside in a novel arrangement of circuit controller for the drive shaft of a motor dynamo unit as set forth more fully in the specification hereinafter following by reference to the accompanying drawings, in which:

Figure 1 is a longitudinal sectional view taken through one embodiment of the motor dynamo unit of our invention;

Fig. 2 is a schematic end elevational view of the motor dynamo unit illustrated in Fig. 1, and showing particularly the circuit controller with associated parts thereof broken away and illustrated in section;

Fig. 3 is a diagrammatic and schematic view of the circuit controller of our invention and the associated motor dynamo stator windings;

Fig. 4 is a diagrammatic view illustrating the electrical control circuit of the assembly illustrated in Fig. 3;

Fig. 5 is a diagrammatic and schematic view of a modified form of our invention;

Fig. 6 is a fragmentary longitudinal sectional view of the driving cam and circuit controller on an enlarged scale showing particularly the bifurcated end of the circuit controller and the connections extending therefrom to positions adjacent the pivotal mounting of the circuit controller;

Fig. 7 is a fragmentary side view of the circuit controller illustrated in Fig. 6, the arm of the circuit controller being broken away to illustrate one of the internal conductors therein;

Fig. 8 is a fragmentary horizontal sectional view taken on line 8—8 of Fig. 2 and illustrating the spring adjustment for the bifurcated arm forming part of the circuit controller;

Fig. 9 is an enlarged transverse sectional view taken on line 9—9 of Fig. 6, showing the internal structure of the arm constituting part of the circuit controller and illustrating particularly the channels through which the conductors extend through the contacts carried by the bifurcated arm of the circuit controller;

Fig. 10 is a longitudinal sectional view taken through another embodiment of motor dynamo embodying our invention;

Fig. 11 is a vertical sectional view taken on line 11—11 of Fig. 10 and illustrating particularly the relationship of the circuit controller to the driving cam on the operating shaft of the motor dynamo of Fig. 10, the pivot of the circuit controller being shown oriented to a particular position for phasing the alternations or pulses supplied to or delivered by the motor dynamo unit;

Fig. 12 is a view similar to the view shown in Fig. 11, but illustrating the electric circuit controller oriented upwardly to a position in which the pivot of the circuit controller is shifted to a position transversely aligned with the center of the axis of the operating shaft of the motor dynamo unit;

Fig. 13 is a schematic and diagrammatic view showing the circuit connections of the motor dynamo unit to the circuit controller;

Fig. 14 is a longitudinal view through the balanced arm of the circuit controller and illustrating the connections to the contacts at opposite ends thereof;

Fig. 15 is a transverse sectional view through the balanced arm on line 15—15 of Fig. 14;

Fig. 16 is a transverse sectional view taken substantially on line 16—16 of Fig. 14; and Fig. 17 is a diagrammatic view explaining the operation of the system of Figs. 10–16.

Our invention is directed to a combination motor dynamo unit capable of operation from either an alternating or direct current power source and capable of delivering an alternating current when operating from a direct current source or capable of delivering a direct current when operating from an alternating current source; or, capable of delivering both alternating and direct current simultaneously when driven as a dynamo generator.

The rotative equipment of our invention comprises a single unit and it is unnecessary to install two different units in order to secure power of different characteristics. Our invention contemplates the utilization or the production of alternating current of industrial frequencies over a frequency range of 25–60 cycles; and for automotive, aircraft, military and governmental operations, over frequency ranges of the order of 400–800 cycles, while at the same time delivering direct current for biasing circuits, and for other purposes.

The construction of the rotative apparatus of our invention may be produced inexpensively on a mass production scale, as the conventional type of commutator and associated brushes with the inherent difficulties in manufacture, maintenance, and replacement thereof, are eliminated. We control sections of the stator winding and circuit connections to the alternating current power circuit and the direct current circuit through a special form of circuit controller which we have devised for precision operation. In one form of our invention this circuit controller may be advanced or retarded in its operation for the proper phasing of the alternating currents employed in the operation of the system. For purposes of explaining the principles of our invention the rotor is assumed to have four poles with a 1:1 ratio with respect to the stator poles, but for operation on higher frequencies the number of poles is correspondingly increased. In another form of our invention we provide a bifurcated or yoke-shaped pivoted arm carrying contacts which control the circuit connections between sections of the stator winding and the power circuits. We have found the embodiments of our invention shown herein highly successful in operation but we realize that modifications may be made and we desire that the description of our invention herein be considered in the illustrative sense and not in the limiting sense.

Referring to the drawings in more detail, reference character 1 designates the frame of the motor dynamo of our invention having an end cover 9 and an end plate 9A fastened by longitudinally extending bolts and securing nuts represented at 2. The stator for the particular motor dynamo illustrated at 1 and 2 is constituted by magnet poles 3. Four poles have been shown as representative of machines of low frequencies but it will be understood that when our invention is applied to alternators of higher frequency the number of poles are correspondingly increased. The four poles shown are sufficient for explaining the purposes of the principles of our invention which may be applied to a variety of motor dynamo units for operation at various frequencies.

The rotor carried by shaft 7 is indicated at 4 arranged for rotation within the stator magnets 3. A ventilating fan 5 is mounted on shaft 7 and is secured in position by fastening nut 8. The rotor 4 is laminated and comprises flat plates of alternately disposed iron and permanently magnetized plates. The laminated plates are clamped in position on shaft 7 by fastening nuts 10. The shaft 7 is journaled in ball bearings 6 mounted in the cover 9 and end plate 9A. The cam 11 is mounted on shaft 7 and is insulated therefrom by means of sleeve 11a.

One arm of insulation material shown at 12, shaped as shown, is pivotally mounted at 13 on the end plate 9A. The arm 12 moves in a plane substantially coplanar with the plane of the cam 11 and is protected by a cover 14 fastened to the frame 1. The end plate 9A provides a tension means for certain fixed contactors which we have represented at 22 and 23 which are spaced sufficiently to enable the bifurcated or yoked end of arm 12, carrying sets of contacts 24 and 25 on the extremities thereof, to fit between the spaced fixed contacts and to move coaxially through an extremely minute gap for controlling circuit connections between sections of the stator and the alternating current power circuit which we have represented at 21 and the direct current power circuit which we have shown at 27. The sets of fixed contacts 22, 23 are each adjustable so that the spatial distance between the contacts may be readily adjusted inasmuch as very precise adjustment is required for proper phasing of the alternate current and the pulse of the direct current. The bifurcated end of the arm 12 which terminates in the sets of contacts 24 and 25 is located on the extremity of arm 12, remote from the pivot 13 thereof. The arm 12 carries a projection 12A thereon which slidably engages the surface of the cam 11. A spring 26 fits into a cup-shaped recess 12B in the wall of arm 12 opposite the projection 12A and is adjustable in standard 26A for selectively controlling the spring pressure upon arm 12 in the direction of the surface of cam 11. The high and low faces on cam 11 are selected according to the number of poles of the unit and the frequency at which the unit operates so that movement of the contacts 24 and 25 respect to the sets of fixed contacts 22 and 23 is governed in proper time relation. The direct current power circuit 27 is shunted by condenser 28 and leads to the two conductors 15 and 15A in the hollow tubular insulated arm 12, connection being made at the pivotally mounted end 13 of the arm 12 at a position subject to a minimum amount of vibration and connection being made at the bifurcated end of the arm to lugs electrically connected with the movable contacts 24 and 25, respectively. Thus, power may be supplied to or collected from the sets of fixed contacts 22 and 23, by contacting relation of movable contacts 24 and 25 therewith. The insulated barrier 12C which extends the entire length of arm 12 insures the complete insulation of conductors 15 and 15a from each other throughout the distance from the movable contacts 24 and 25 to the terminal positions adjacent the pivot 13 at which the conductors leave the pivotally mounted arm 12 and connect to the direct current power circuit 27.

In the form of our invention illustrated in Figs. 2, 3 and 4, we have shown, in addition to the main magnet windings 3, sets of auxiliary magnet windings 16 which are arranged intermediate the main magnet windings 3 on poles which are retracted with respect to the poles constituting the main magnets. External circuits are arranged for the main magnet windings 3 and the auxiliary magnets 16, as represented in Figs. 2, 3 and 4, where the outlet lead of one of the main magnets 3, as represented at 17, connects to the outlet lead 18 of the auxiliary magnet winding 16 and then conjointly connect to the fixed contactors 22. The input to one of the main magnet windings 3 represented at 19 electrically connects with an input lead 20 of an adjacent auxiliary magnet winding 16, thus providing a sectionalized stator winding, providing for starting and running operation under control of the rapid movement of arm 12 governed by the rotation of cam 11.

In Fig. 5 we have shown a modified form of our invention in which alternating current may be delivered or supplied at the position 21 with respect to windings 3 of the motor dynamo unit and wherein there is also provided a transformer 31 by which alternating current may be supplied to the power circuit 27A or delivered by the power circuit 27A to the magnet windings 3 of the unit, operating as an alternator. In this form of our invention the contact system is modified so that movable contact 24A is operated by an arm represented at 12', pivoted at 13, controlled by the actuator cam, which alternately connects one-half of one of the transformer windings through mid-tap connection 31A to the power supply circuit 27A, enabling direct current pulses to be supplied to the transformer for delivery to the windings 3, or enabling direct current pulses to be delivered from the transformer to the power supply circuit 27A. Thus alternating or direct current may be supplied to or delivered by power circuit 27A. The circuit of Fig. 5 does not employ auxiliary magnets but, in lieu thereof, includes the transformer device 31. This transformer arrangement reduces the number of contacts required as it will be noted that only the arm 12' operating between the pair of contactors 22 are necessary.

Figs. 10–17 show a further arrangement of our invention. Fig. 10 illustrates a motor dynamo of the same general construction as hereinbefore explained, except that the end plate 9A in this instance is provided with a pair of arcuate-shaped adjustment slots 33 and 34 with which there is aligned similarly shaped slots 33' and 34' in the disc of insulation material, shown at 32, which enables the disc 32 to be oriented or angularly shifted under control of adjustment screws 35 and 36 which pass through the disc of insulation material 32 and through the end plate 9A and are secured to the support 37 through which shaft 7 passes. The support 37 is centered on shaft 7 which freely revolves within the support 37. Support 37 forms a backing for the plate 9A and supports the nuts 38 and 39 through which screws 35 and 36 extend for insuring the maintenance of disc 32 in a position in which it is set. The disc 32 provides a mounting means for the insulated arm 40 which is pivoted at 41 on the insulation disc 32. The arm 40 carries at its opposite extremities the contacts 42 and 43 which are aligned with the sets of fixed contacts 44, 45 and 46, 47, and with respect to which the sets of contacts 42 and 43 establish connection under control of the actuator cam 11, the surface of which is engaged by the projection 48 on the pivoted arm 40. A spring 49 is attached to arm 40 and tends to continuously pull arm 40 in a direction urging projection 48 into contact with the surface of cam 11. When the surface of cam 11 moves to register a low area beneath projection 48, contact 42 establishes connection with contactor 44 while contact 43 establishes connection with contactor 47. When a high point on the surface of cam 11 moves beneath projection 48 the arm 40 is rocked to the position illustrated in Fig. 17 in which contact 42 breaks connection with contactor 44 and establishes connection with contactor 45 while, simultaneously, contact 43 establishes connection with contact 46 and breaks connection with contact 47, as represented in Fig. 17. This enables the alternating current or the direct current to be selectively delivered to the selective power circuits or supplied to the motor dynamo windings.

In order to properly phase the alternating current with respect to the alternating current windings 3 or with respect to the direct current pulses supplied to or delivered by the direct current power circuit 27, we adjust the angular position of disc 32 about shaft 7 as a center, as represented, for example, in Fig. 12, where disc 32 has been oriented counterclockwise, carrying the center 41 to a position in horizontal alignment with the axis of shaft 7. Under these conditions the low part of the surface of cam 11 has been advanced with respect to the position of projection 48, so that the timing of the sequence of operations changes. Although we have illustrated the adjustment of disc 32 in a counterclockwise direction to produce a lagging phase, it is equally possible to advance the phasing by rotating the disc 32 in a clockwise direction within the limits of the lengths of slots 33 and 34 to secure a more precise timing of the alternations or pulses. Once set in the proper position, the screws 35 and 36 are tightened in the socket nuts 38 and 39 carried by support 37, whereupon the cyclic operation of arm 40, with respect to the contactors, repeats, insuring operation of the system on alternating current or the proper supply or delivery of the direct current pulses.

Fig. 17 explains the theory of our invention more clearly by showing the instantaneous polarities existent in the system. For example, windings 3 have their opposite ends alternately or plus (+) and minus (−), so that contactors 44 and 45 alternately change in polarity according to the frequency of the current delivered to or delivered by the windings on magnets 3, as represented by the alternating current power circuit 21. Arm 40 oscillates under control of cam 11 between the fixed contactors 44, 45 and 46, 47. The contactor 46 connects to contactor 44, while contactor 47 connects to contactor 45. With the high point of actuator cam 11 moving against projection 48, contact 42 establishes connection with contactor 45 while contact 43 establishes connection with contactor 46. Instantaneous negative potential on contactor 45 is transferred through contact 42 to the negative side of power circuit 27. At the same time instantaneous positive polarity on contactor 44 is transferred through contactor 46 and contact 43 to the positive side of power circuit 27. Inasmuch as cam 11 is shaped to mechanically shift arm 40 at the rate at which the change of direction of current occurs in the windings of magnets 3, rotation of cam 11 results in the displacement of arm 40, so that contact 42 thereof connects to contactor 44 in the immediate succeeding cycle, while contact 43 connects to contactor 47. Inasmuch as the instantaneous polarity has changed at contactors 44 and 45, a negative pulse is now transferred from contactor 44 to the negative side of power circuit 27 through contact 42, while a positive pulse is transferred from contactor 47 to contact 43 to the positive side of power circuit 27.

The phenomena which we have described, progressively repeats, insuring a direct current supply at circuit 27 and an alternating current supply at circuit 21 when the motor dynamo unit is driven as a generator or the selective supply or utilization of direct or alternating current when the rotative apparatus operates as a motor.

One of the important requirements in carrying out the successful operation of the system of our invention is the maitenance of a minute gap or space through which the contacts cooperate with the contactors. In certain of our investigations, we have found that this gap is of the order of a few tenths of a millimeter, not exceeding 5/10.

Our invention is particularly desirable from the viewpoint of the manufacturer as commutators and the associated brushes are entirely eliminated. This reduces operational failures due to wearing of brushes and the necessity of periodically machining the surfaces of the commutator segments. The manufacturing costs are correspondingly reduced.

Our invention is also applicable to conventional types of commutator machines where the circuit controller is used as an addition to the commutator in producing alternating current simultaneously with the commutated direct current or vice versa.

While we have described our invention in certain preferred embodiments we realize that modifications may be made, and we desire that it be understood that no limitations upon our invention are intended other than may be imposed by the scope of the appended claims.

What we claim as new and desire to secure by Letters Patent of the United States is as follows:

1. A motor dynamo comprising a frame, a sectionally wound stator coacting with a rotor, a shaft for journalling said rotor in said frame for rotation within said stator, a cam carried by said shaft, an arm pivotally mounted adjacent said frame in contacting relation to said cam, contacts carried by said arm, fixed contactors mounted adjacent said frame in coacting relation to the contacts on said arm, an alternating current power circuit connected to certain of said fixed contactors, a direct current circuit, said cam having an actuating surface including high and low points for moving said arm at a rate corresponding to the frequency generated in said sectionally wound stator for moving said contacts into contacting relation with said contactors, and connections from said direct current circuit to certain of said contacts whereby movement of said arm controls the connections of said direct current circuit with reference to said sectionally wound stator.

2. A motor dynamo as set forth in claim 1 in which said arm is disposed substantially coplanar with said cam and is shifted thereby between said contactors.

3. A motor dynamo as set forth in claim 1 in which said arm is formed from tubular insulation material and wherein conductors extend through the tubular insulation material and establish connection with the contactors carried by said arm, said conductors extending from a position adjacent the pivotal mounting thereof to said direct current circuit for minimizing the displacement of said conductors adjacent the pivotal mounting of said arm during pivotal movement of said arm.

4. A motor dynamo as set forth in claim 1 in which the pivotal mounting of said arm is located at one end of said arm and wherein the contacts carried by said arm are located at the opposite end thereof and wherein conductors lead from the contacts on the last mentioned end of said arm to a position adjacent the pivotal mounting thereof and connect to said direct current circuit with minimum displacement of said conductors adjacent the pivotal mounting of said arm during pivotal movement of said arm.

5. A motor generator as set forth in claim 1 in which the pivotal mounting of said arm is located adjacent one end of said arm and wherein the other end of said arm is bifurcated with the bifurcations extending between said fixed contactors, said contacts being mounted adjacent the end of said bifurcation and movable into and out of contacting relation with said contactors.

6. A motor dynamo as set forth in claim 1 in which said arm is formed from tubular insulation material, the pivotal mounting of said arm being disposed adjacent one end of said tubular arm, electrical conductors extending through said tubular arm and terminating adjacent the tubular mounting of said arm in flexible connections leading to said direct current circuit, the other end of said arm being bifurcated with the bifurcations thereof extending between said fixed contactors, said contacts being mounted on said befurcations in alignment with said contactors for establishing electrical connection therewith during the movement of said arm.

7. A motor dynamo as set forth in claim 1 including spring means for yieldingly urging said arm into sliding relation with the surface of said cam, the end of said arm opposite the pivotally mounted portion of said arm being bifurcated with the bifurcation thereof extending between said fixed contactors and wherein said contacts are mounted adjacent the ends of the bifurcations on said bifurcated arm for establishing contacting relation with said fixed contactors, the high points of said cam and said spring means coacting to move the contacts on said bifurcations into contacting relation with certain of said contactors while the low points of said cam and said spring means coact to urge said contacts on said bifurcations into electrical connection with others of said contactors.

8. A motor dynamo as set forth in claim 1 in which said arm is pivotally mounted adjacent the center thereof and wherein said contacts are located on opposite ends of said arm, and wherein said fixed contactors are located in alignment with said contacts adjacent opposite ends of said arm whereby the movement of said arm is symmetrically controlled between said fixed contactors for correspondingly controlling said direct current circuit in relation to said sectionally wound stator.

9. A motor dynamo as set forth in claim 1 in which the pivotal mounting for said arm is located at the center of said arm and where the contacts carried by said arm are located adjacent opposite ends of the arm, said fixed contactors being mounted at opposite sides of the path of movement of the contacts on the ends of said arm, and means displaced from the position of said fixed contactors for selectively adjusting the position of the pivotal mounting of said arm with respect to the axis of rotation of said cam.

10. A motor dynamo as set forth in claim 1 in which a plate of insulation material is orientatably mounted on said frame and wherein the pivotal mounting of said arm and said fixed contactors are located on said plate, and means adjacent said frame displaced from the location of said fixed contactors and connected with said plate for selectively fixing the position of the pivotal mounting of said arm with respect to the center of said cam.

11. A motor dynamo as set forth in claim 1 in which a plate of insulation material is orientatably mounted on said frame and wherein the pivotal mounting of said arm and said fixed contactors are located on said plate, said fixed contactors being arranged in pairs and symmetricaly disposed on opposite sides of each end of said arm in contacting relation to the contacts carried by said arm and in which said plate contains arcuate-shaped slots adjacent the periphery thereof displaced from the location of said fixed contactors, and wherein said frame has similarly formed slots with which the aforesaid slots are alignable and means adjacent said frame and coacting with means extending through said aligned arcuate-shaped slots for selectively fixing said plate in a predetermined position with respect to said frame for setting the center of said pivotal mounting for said arm with respect to the axis of said cam.

12. A motor dynamo comprising a rotor and stator system, a shaft connected to said rotor, a stator winding on said stator system, an alternating current power circuit connected with said stator winding, a transformer including a pair of coupled windings, one of said coupled windings being connected with said stator winding and the other of said coupled windings including a center tap, a composite direct and alternating current power circuit, a cam on said shaft, a pivotally mounted arm controlled by the rotation of said cam, contacts carried by said arm, a pair of fixed contactors mounted on opposite sides of the path of movement of said arm in coacting relation to said contacts, connections between said fixed contactors and opposite terminals of said last mentioned coupled winding, a connection between the center tap on said last mentioned coupled winding and one side of said composite direct and alternating current power circuit, and a connection between said contacts carried by said arm and the other side of said composite direct and alternating current power circuit.

References Cited in the file of this patent

UNITED STATES PATENTS

| | | |
|---|---|---|
| 1,194,160 | Fortescue | Aug. 8, 1916 |
| 1,238,923 | Kennedy | Sept. 4, 1917 |
| 1,962,992 | Leece et al. | June 12, 1934 |
| 1,981,738 | McNeil | Nov. 20, 1934 |
| 2,184,315 | Peters et al. | Dec. 26, 1939 |
| 2,301,425 | List | Nov. 10, 1942 |

FOREIGN PATENTS

| | | |
|---|---|---|
| 383,921 | Germany | Nov. 26, 1923 |